(12) United States Patent
Ouwehand et al.

(10) Patent No.: US 10,279,340 B2
(45) Date of Patent: May 7, 2019

(54) PROCESS FOR PREPARING HYDROCRACKING CATALYST

(71) Applicant: SHELL OIL COMPANY, Houston, TX (US)

(72) Inventors: Cornelis Ouwehand, Amsterdam (NL); Marcello Stefano Rigutto, Amsterdam (NL); Arend Jan Van Welsenes, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/366,739

(22) PCT Filed: Dec. 20, 2012

(86) PCT No.: PCT/EP2012/076292
§ 371 (c)(1),
(2) Date: Jun. 19, 2014

(87) PCT Pub. No.: WO2013/092806
PCT Pub. Date: Jun. 27, 2013

(65) Prior Publication Data
US 2015/0209772 A1    Jul. 30, 2015

(30) Foreign Application Priority Data

Dec. 23, 2011 (EP) .................................... 11195488

(51) Int. Cl.
| | |
|---|---|
| *B01J 21/12* | (2006.01) |
| *B01J 29/06* | (2006.01) |
| *C10G 65/00* | (2006.01) |
| *C10G 47/12* | (2006.01) |
| *B01J 31/04* | (2006.01) |
| *B01J 23/883* | (2006.01) |
| *B01J 37/02* | (2006.01) |
| *B01J 37/18* | (2006.01) |
| *B01J 37/20* | (2006.01) |
| *B01J 37/32* | (2006.01) |
| *B01J 23/888* | (2006.01) |
| *B01J 27/19* | (2006.01) |
| *B01J 35/02* | (2006.01) |
| *B01J 37/00* | (2006.01) |
| *B01J 27/049* | (2006.01) |
| *B01J 31/02* | (2006.01) |
| *B01J 31/34* | (2006.01) |

(52) U.S. Cl.
CPC ............. *B01J 31/04* (2013.01); *B01J 21/12* (2013.01); *B01J 23/883* (2013.01); *B01J 23/888* (2013.01); *B01J 27/049* (2013.01); *B01J 27/19* (2013.01); *B01J 29/061* (2013.01); *B01J 31/0204* (2013.01); *B01J 31/34* (2013.01); *B01J 35/023* (2013.01); *B01J 37/0036* (2013.01); *B01J 37/0203* (2013.01); *B01J 37/0236* (2013.01); *B01J 37/18* (2013.01); *B01J 37/20* (2013.01); *B01J 37/32* (2013.01); *C10G 47/12* (2013.01); *C10G 65/00* (2013.01); *B01J 2229/42* (2013.01)

(58) Field of Classification Search
CPC ...... B01J 31/04; B01J 27/049; B01J 31/0204; B01J 31/34; B01J 37/0236; B01J 29/061; B01J 23/888; B01J 37/18; B01J 37/20; B01J 27/19; B01J 37/32; B01J 35/023; B01J 37/0036; C10G 65/00
See application file for complete search history.

(56) References Cited

U.S. PATENT DOCUMENTS

| | | | |
|---|---|---|---|
| 3,304,254 A | 2/1967 | Eastwood et al. | |
| 2007/0037695 A1 | 2/2007 | Brun et al. | |
| 2007/0155618 A1 | 7/2007 | Diehl et al. | |
| 2008/0087577 A1 | 4/2008 | Cholley et al. | |
| 2010/0187155 A1* | 7/2010 | McCarthy ............. | C10G 45/12 208/58 |
| 2010/0236988 A1 | 9/2010 | Gabrielov et al. | |
| 2011/0100875 A1* | 5/2011 | Singh ...................... | B01J 21/12 208/111.3 |

FOREIGN PATENT DOCUMENTS

| | | |
|---|---|---|
| CN | 101553554 | 10/2009 |
| CN | 101553554 | 8/2013 |
| EP | 0482817 | 4/1992 |
| EP | 0601722 | 6/1994 |
| WO | 2004018097 | 3/2004 |
| WO | WO2008045550 | * 4/2008 |
| WO | WO 2008045550 | * 4/2008 |
| WO | 2010124935 | 11/2010 |

* cited by examiner

*Primary Examiner* — Randy Boyer
*Assistant Examiner* — Juan Valencia
(74) *Attorney, Agent, or Firm* — Charles W. Stewart

(57) ABSTRACT

Process for preparing a sulphided hydrocracking catalyst comprising the steps of (a) treating an amorphous silica alumina carrier with one or more Group VIB metal components, one or more Group VIII metal components and a $C_3$-$C_{12}$ polyhydric compound, (b) drying the treated catalyst carrier at a temperature of at most 200° C. to form an impregnated carrier, and (c) sulphiding the impregnated carrier to obtain a sulphided catalyst.

8 Claims, No Drawings

PROCESS FOR PREPARING HYDROCRACKING CATALYST

PRIORITY CLAIM

The present application is the National Stage (§ 371) of International Application No. PCT/EP2012/076292, filed Dec. 20, 2014, which claims priority from European application no. 111954889.9, filed Dec. 23, 2011, the disclosures of which are incorporated herein by reference.

The invention relates to a process for preparing hydrocracking catalyst, and a hydrocracking process using the catalyst.

Processes that comprise treating crude oil and other petroleum feedstocks with hydrogen in the presence of a catalyst are well known. One such process is hydrocracking, in which heavy distillate hydrocarbons are converted under hydrogen pressure into products of lower molecular weight in the presence of a catalyst. Hydrocracking is used in the oil industry to prepare a wide range of materials, ranging from C3/C4 production to luboil manufacture.

Hydrocracking differs from hydrotreating in that hydrotreating aims to remove sulphur containing compounds with minimal breaking of carbon-carbon bonds while hydrocracking depends on breaking down the heavier oil molecules. In commercial practice, there is a clear distinction between hydrocracking and hydrotreating catalysts because hydrocracking catalysts are deactivated by contaminants which are the prime target of hydrotreating catalysts. The difference in aim makes that hydrotreating and hydrocracking catalysts differ in composition and manufacturing method.

Hydrocracking may be operated as either a single- or multi-stage process. Multi-stage hydrocracking typically involves a first stage, which is predominantly a hydrotreatment stage wherein impurities and unsaturated compounds are hydrogenated in the presence of a first catalyst having a high hydrogenation function, and a second stage where most of the cracking occurs in the presence of a second catalyst having a strong cracking function. In single-stage hydrocracking, the treatment and cracking steps occur in one reactor and may be performed using a single catalyst or using several sequential catalyst beds, typically two beds, in series in one reactor, i.e. as a stacked bed. Likewise, in multi-stage hydrocracking, each stage may use a single catalyst or a stacked bed of multiple catalysts, typically two.

The catalysts employed in hydrocracking are generally made from a carrier material on which there are deposited catalytically active metals chosen from the group consisting of nickel, cobalt, molybdenum, tungsten, palladium and platinum.

The higher the activity of a hydrocracking catalyst the more efficient a conversion will be. In particular, a more active catalyst can be operated at a lower temperature than a less active catalyst to achieve the same degree of conversion. This is advantageous as a lower operating temperature prolongs catalyst life and decreases operating costs. Accordingly, there is always a need for improving catalyst activity.

Sometimes a complexing agent is added during catalyst manufacture in order to stabilize the metal containing solution and/or to inhibit coagulation of active metals deposited on the carrier.

Several organic additives are described to have a benefit for alumina-based hydrotreating catalysts. Examples are a hydrocarbon oil and a polar additive such as dimethyl formamide (US 2010/236988), unsaturated diols (US 2008/087577), orthophthalate esters (US 2007/037695), organic nitrogen-containing compounds (US 2007/155618), hydroxycarboxylic acids (EP 482 817) or sugar derivatives (WO 2004/018097).

The present invention now provides a process for preparing a sulphided hydrocracking catalyst comprising the steps of
(a) treating an amorphous silica alumina carrier with one or more Group VIB metal components, one or more Group VIII metal components and a $C_3$-$C_{12}$ polyhydric compound,
(b) drying the treated catalyst carrier at a temperature of at most 200° C. to form an impregnated carrier, and
(c) sulphiding the impregnated carrier to obtain a sulphided catalyst.

The catalyst of the present invention employs an amorphous silica-alumina material as the carrier. The term "amorphous" indicates a lack of crystal structure, as defined by X-ray diffraction, in the carrier material, although some short range ordering may be present. Amorphous silica-alumina suitable for use in preparing the catalyst carrier is available commercially. Alternatively, the silica-alumina may be prepared by a co-gelation process or a grafting process, as are well known in the art. The amorphous silica-alumina preferably contains silica in an amount in the range of from 25 to 95% by weight as calculated on the carrier alone (i.e. based on total carrier). More preferably the amount of silica in the carrier is greater than 35 wt %, and most preferably at least 40 wt %. A very suitable amorphous silica-alumina product for use in preparing the catalyst carrier comprises 45% by weight silica and 55% by weight alumina and is commercially available (ex. Criterion Catalysts and Technologies, USA).

Optionally, a zeolite may be included in the carrier. The zeolite may be any zeolite proposed for use in a hydrocracking catalyst. However good results have been found with the use of a faujasite zeolite, particularly a zeolite Y. The zeolite Y is usefully a stabilised zeolite Y having a unit cell size in the range of from 24.10 to 24.40 A and a bulk or overall silica to alumina ratio (SAR) in the range of from 4 to 100. Preferably the zeolite Y has a SAR in the range of from 20 to 100, especially from 25 to 90. Such zeolite Y materials are readily available commercially such as, for example, from Zeolyst International.

More than one zeolite may be present in the catalyst, and such additional zeolite may be any suitable zeolite found to exhibit a useful hydrocracking activity, especially when used in a small quantity in a hydrocracking catalyst. Suitable additional zeolite can be selected from zeolite beta, zeolite ZSM-5, and a zeolite Y of a different unit cell size and/or SAR than primarily used in the catalyst of the invention.

If present, the amount of total zeolite in the catalyst of the invention is usefully in the range of from 1 to 40 wt % based on total weight of the carrier and preferably in the range of from 1 to 20, especially 1 to 10, wt %.

The process further comprises treating the carrier with one or more a Group VIII metal components and one or more Group VIB metal components, which metals are as given in the Periodic Table published in the CRC Handbook of Chemistry and Physics, 68th Edition, 1985, CRC Press, INC.

Preferably, the Group VIII metal is selected from to group consisting of nickel, cobalt, and mixtures thereof; whilst the Group VIB metal is preferably selected from the group consisting of molybdenum and tungsten and mixtures thereof. In a preferred embodiment, the Group VIII metal is nickel and the Group VIB metal is molybdenum and/or tungsten, preferably molybdenum.

The amount of Group VIII metal and Group VIB metal in the catalyst may vary depending on the metal type and the intended purpose of the catalyst, however, the amount of Group VIII metal will preferably be in the range of from 0.5 to 10 wt %, whilst the amount of Group VIB metal will preferably be in the range of from 3 to 30 wt %, measured as the metal, based on total weight of catalyst. A preferred catalyst according to the present invention, comprises nickel in an amount in the range of from 1 to 6 wt %, more preferably 3 to 6 wt %; and molybdenum in an amount in the range of from 6 to 19 wt %, preferably 10 to 16 wt %, or tungsten in an amount in the range of from 10 to 25 wt %, preferably 15 to 22 wt %.

The manufacture of the hydrocracking catalyst further comprises treatment with a $C_3$-$C_{12}$ polyhydric compound. It was found that use of the $C_3$-$C_{12}$ polyhydric compound provides a more stable catalyst displaying an enhanced hydrocracking activity, especially in a first stage hydrocracking bottom bed application. Without being bound by theory, it is believed that addition of the $C_3$-$C_{12}$ polyhydric compound facilitates formation of a glassy impregnate state on drying, with metals dissolved (and thus dispersed). The thus treated catalyst carrier is dried and sulphided without intermittent calcinations. In these specific circumstances, this is thought to lead to enhanced dispersion of the metals in the sulfided state.

The $C_3$-$C_{12}$ polyhydric compound preferably is a sugar, a sugar alcohol and/or a sugar acid. More preferably, it is a $C_6$ or $C_{12}$ sugar, sugar alcohol and/or sugar acid. Especially preferred compounds are sucrose and/or gluconic acid.

The $C_3$-$C_{12}$ polyhydric compound is present in the dried and treated catalyst in an amount corresponding to 3-30 wt %, preferably 5-20 wt %, based on the total weight of the catalyst.

Phosphoric acid may be included in the catalyst. As phosphoric acid, any one of metaphosphoric acid, pyrophosphoric acid, orthophosphoric acid, triphosphoric acid and tetraphosphoric acid may be used. A soluble salt of the acid such as nickel phosphate may also be used. The amount in the dried and treated catalyst typically is 0.1-10 wt %.

Fluorine compounds may also be included in the catalyst, to increase the activity of the catalyst, as is described in U.S. Pat. No. 3,6713,108. This may be achieved by including a water-soluble compound in the impregnation solution, such as hydrofluoric acid, trifuoloracetic acid or hexafluorophosphoric acid, or suitable salts thereof. The fluorine level on the catalyst is preferably in the range of 0.1 to 6.0 wt %. Fluorine is gradually lost from the catalyst during operation. Its level can be maintained by addition of a hydrocarbon-soluble fluorine compound to the feed, as described in U.S. Pat. No. 3,6713,108. Examples of suitable fluorine compounds include 1,1-difluoroethane or o-fluorotoluene.

The total surface area of the catalyst is preferably greater than 100 $m^2/g$ and more preferably in the range of from 200 to 300 $m^2/g$, as determined by the BET method according to ASTM test D3663-03. The total pore volume is preferably greater than 0.4 ml/g. The minimum surface area required determines the maximum pore volume which can be applied. Preferably in the range of from 5 to 40% by volume of the total pore volume is present as pores having a diameter of more than 350 A. The pore volume is determined using the Standard Test Method for Determining Pore Volume Distribution of Catalysts by Mercury Intrusion Porosimetry, ASTM D 4284-88.

The catalyst as described herein may be prepared by any of the suitable preparation techniques known in the art. Preferably, a single step impregnation method is used. The carrier comprising the amorphous silica-alumina is impregnated with a solution comprising the Group VIII metal, the Group VIB metal, and the $C_3$-$C_{12}$ polyhydric compound, and any further additive (phosphoric acid, fluorine), and the resulting catalyst is dried at a temperature of at most 200° C.

The amorphous silica-alumina carrier, optionally including a zeolite, may be prepared by any of the suitable carrier preparation techniques known in the art. A preferred method for the preparation of the carrier comprises mulling a mixture of the amorphous silica-alumina, optionally the zeolite and a suitable liquid, extruding the mixture and drying and heating the resulting extrudate.

The extrudate may have any suitable form known in the art, for example cylindrical, hollow cylindrical, multilobed or twisted multilobed. A preferred shape for the catalyst particles is multilobed, for example trilobed. Typically, the extrudates have a nominal diameter of from 0.5 to 5 mm, preferably from 1 to 3 mm.

After extrusion, the extrudate is dried. Drying may be performed at an elevated temperature, preferably up to 300° C., more preferably up to 200° C. The period for drying is typically up to 5 hours, preferably in the range of from 30 minutes to 3 hours. Preferably, the extrudate is then further heated (calcined) after drying at very high temperature, preferably between 400 and 1000° C., typically for a period of up to 5 hours, preferably in the range of from 30 minutes to 4 hours.

The Group VIII and Group VIB metals may be deposited on the carrier using any of the suitable methods known in the art, for example by ion exchange, competitive ion exchange or impregnation. When using impregnation, this is preferably done together with the $C_3$-$C_{12}$ polyhydric compound, and further additives if included. When impregnating is done together with the $C_3$-$C_{12}$ polyhydric compound, drying should be done at a temperature not exceeding 200° C., preferably not exceeding 170° C., more preferably not exceeding 120° C.

Alternatively, the treated catalyst carrier is dried by freeze drying which comprises freezing the treating catalyst carrier and reducing the surrounding pressure to allow the frozen water to sublimate directly from the solid phase to the gas phase. Catalyst prepared in this way was found to be especially active in hydrocracking in that the process could be carried out at reduced pressure and/or the product obtained had reduced sulphur and/or nitrogen content.

The hydrocracking catalyst is sulfided prior to use in a hydrocracking process. The catalyst may conveniently be sulfided by any of the techniques known in the art, such a ex-situ or in-situ sulfidation. For example, sulfidation may be performed by contacting the catalyst with a sulphur-containing gas, such as a mixture of hydrogen and hydrogen sulfide, a mixture of hydrogen and carbon disulfide or a mixture of hydrogen and a mercaptan, such as butylmercaptan. Alternatively, sulfidation may be carried out by contacting the catalyst with hydrogen and a sulphur-containing hydrocarbon oil, such as sulphur-containing kerosene or gas oil. The sulphur may also be introduced into the hydrocarbon oil by the addition of a suitable sulphur-containing compound, for example dimethyldisulfide or tert-nonylpolysulfide.

The hydrocracking process using the catalyst of the present invention comprises hydrocracking a hydrocarbon feedstock in the presence of hydrogen and the hydrocracking catalyst. As will be understood by those skilled in the art, the conditions employed for the hydrocracking process may vary, however, in general the temperature of the conversion is preferably in the range of from 250 to 500° C., more preferably 300 to 450° C., and most preferably 350 to 450° C. Moreover, the total pressure in the hydrocracking process will preferably be in the range of from $5\times10^6$ Pa (50 bar) to $3\times10^7$ Pa (300 bar), more preferably $7.5\times10^6$ Pa (75 bar) to $2.5\times10^7$ Pa (250 bar) and even more preferably $1\times10^7$ Pa (100 bar) to $2\times10^7$ Pa (200 bar); whilst hydrogen partial pressure will preferably be in the range of from $2.5\times10^6$ Pa (25 bar) to $2.5\times10^7$ Pa (250 bar), more preferably $5\times10^6$ Pa (50 bar) to $2\times10^7$ Pa (200 bar) and still more preferably $6\times10^6$ Pa (60 bar) to $1.8\times10^7$ Pa (180 bar). Furthermore, the space velocity of the feedstock in terms of kg fresh feedstock per litre catalyst per hour ($kg \cdot l^{-1} \cdot h^{-1}$) will preferably be in the range of from 0.1 to 10, more preferably 0.2 to 8, and even more preferably 0.5 to 5; whilst total gas rates (gas/feed ratios) will preferably in the range of from 100 to 5000 Nl/kg, more preferably 250 to 2500 Nl/kg.

A wide range of hydrocarbon feedstocks may be used in the hydrocracking process. Examples of feedstocks that may conveniently be employed include gas oils, coker gas oils, vacuum gas oils, deasphalted oils, fractions (e.g. gasoil and wax fractions) prepared using a Fischer-Tropsch synthesis process, long residues, catalytically cracked cycle oils, thermally or catalytically cracked gas oils, and syncrudes, optionally originating from tar sands, shale oils, residue upgrading processes or biomass. Combinations of various hydrocarbon oils may also be employed. The feedstock will generally be such that at least 50 wt % has a boiling point above 370° C. The nitrogen or sulphur contents in the hydrocarbon feedstock are not critical, and the feedstock may have a nitrogen content of up to 5000 ppmw (parts per million by weight) and a sulphur content of up to 6 wt %. Typically, nitrogen contents may be in the range of from 250 to 2000 ppmw and sulphur contents are in the range of from 0.2 to 5 wt %.

Catalysts prepared by the process of the present invention may be used to advantageous effect in multi-stage hydrocracking, particularly as the bottom bed catalyst in a stack of multiple catalyst beds, where catalysts based on amorphous silica-alumina were shown to display better and more stable hydrodenitrogenation activity and higher hydrocracking activity than alumina based pretreat catalysts. Such a stack can for instance consist of a top bed of an alumina-based catalyst and a bottom bed of a silica-alumina-based catalyst in a volume ratio of alumina-based catalyst to silica-alumina-based catalyst varying from 1:1 to 4:1.

Catalysts of the present invention may also be used to advantageous effect in single-stage hydrocracking, wherein it gives a good efficiency of conversion even on exposure to feedstocks comprising nitrogen and sulphur-containing contaminants.

One application of single-stage hydrocracking is the production of middle distillate fractions. Middle distillate fractions are liquid fractions having a boiling point in the range of from 150 to 370° C., and include products such as kerosene (150 to 250° C.) and gas oil (250 to 370° C.). There is a growing demand for middle distillate products, and as such there is always a need for hydrocracking processes that show a strong selectivity for middle distillates with minimum formation of gaseous ($C_1$-$C_4$) material, i.e. processes whose products contain low amounts of gaseous material and high amounts of middle distillate. In this regard, the hydrocracking process of the present invention has proven to be extremely selective at converting heavy distillate feedstocks, such as heavy gas oils or deasphalted oils to middle distillate fractions.

EXAMPLES

The amorphous silica-alumina carrier used in the examples was a 1.3 mm trilobe of amorphous silica-alumina extrudate having a water pore volume of 0.78 ml/g.

Example 1

Preparation of a Calcined Catalyst (not According to the Invention)

5.55 g citric acid monohydrate was dissolved in 10 ml demineralized water. 3.90 g nickel carbonate (39.80% w Ni) was added and the mixture was heated until a clear green solution was obtained. Next, 9.19 g ammonium metatungstate (70.9% w W) was added and demineralized water was added until the resulting clear solution reached a total volume of 16.2 ml. The solution was then used to impregnate 20.8 g of an amorphous silica-alumina carrier. The catalyst was then dried in a ventilated furnace at 120° C. for 2 hours, and subsequently calcined at 450° C. for 2 hours. The loading of the catalyst, in mass % on a dry weight basis, was 5.0% Ni and 21.0% W. (Denoted "A")

Example 2

Preparation of a Catalyst According to the Invention 32.63 g $MoO_3$, 6.52 g NiO, 60 g $H_2O$ and 12.18 g $H_3PO_4$ (85%) were combined and boiled for approximately 45 min. until a clear green solution was obtained. After cooling, 25.0 g gluconic acid solution (50% in H2O) was added to give a bluish dark green solution, which was briefly boiled leading to further color change to greenish dark blue. Resulting total mass of the solution was 105.7 g. One fifth of this solution (21.4 g) was diluted to the required volume (24.3 g, 15.6 ml) and used to impregnate 20.0 g of an amorphous silica-alumina carrier. The catalyst was subsequently dried at 70° C., in a vacuum stove. The loading of the catalyst, in mass % on a dry weight basis, was 3.5% Ni, 15.0% Mo, 2.2% P, and 8.53% gluconic acid. (Denoted "B",)

Example 3

Preparation of a Catalyst According to the Invention 16.2 g $MoO_3$, 3.25 g NiO, 30.0 g $H_2O$ and 5.94 g $H_3PO_4$ (85%) were combined and boiled for approximately 45 min., allowing some evaporation of water, until a clear green solution was obtained, with a total mass of 46.5 g. This was allowed to cool and split in two equal portions of 23.25 g. To one of the portions was added 3.13 g sucrose to give a bluish dark green solution, which was briefly boiled leading to further color change to dark blue. This solution was diluted to the required volume (29.0 g, 19.0 ml) and used to impregnate 25.0 g of an amorphous silica-alumina carrier. The catalyst was subsequently cooled in an IPA/$CO_2$ bath and freeze dried overnight. The loading of the catalyst, in mass % on a dry weight basis, was 3.5% Ni, 15.0% Mo, 2.2% P, and 8.53% sucrose. (Denoted "C")

Example 4

Testing of the Catalysts

The catalysts "A"-"C" were tested for the hydrocracking, hydrodesulfurization and hydrodenitrogenation activity in a first stage hydrocracking simulation test using a heavy gasoil feedstock having the properties shown in the following Table:

| Feedstock Properties | | |
|---|---|---|
| Density at 15/4° C., | g/ml | 0.9198 |
| Density at 70/4° C., | g/ml | 0.8856 |
| Kin. viscosity at 100° C., | cSt | 6.995 |
| Carbon content, | % w | 85.28 |
| Hydrogen content, | % w | 12.07 |
| Sulphur content, | % w | 2.65 |
| Total nitrogen content, | ppmw | 780 |
| Aromatics content | % w | 15.1 |
| Initial boiling point | ° C. | 281 |
| 10% w boiling point | ° C. | 369 |
| 50% w boiling point | ° C. | 441 |
| 90% w boiling point | ° C. | 516 |
| Final boiling point | ° C. | 580 |
| Fraction boiling below 370° C. | % w | 10.3 |
| Fraction boiling above 540° C. | % w | 3.6 |

The testing was carried out in once-through microflow equipment loaded with a catalyst bed comprising a top bed of 15 ml Criterion DN-3300 catalyst, 1.3 mm trilobes, diluted with an equal volume of 0.05 mm silicon carbide particles, and a bottom bed of 5 ml of the catalyst under scrutiny, also diluted with an equal volume of 0.05 mm silicon carbide particles.

Prior to the testing, the catalyst was liquid-phase presulfided using a gasoil feed and a mixture of hydrogen and hydrogen sulfide at a pressure of 112 bar and with a temperature profile rising from ambient (22° C.) to a final temperature of 345° C.

To measure hydrocracking, hydrodesulfurization and hydrodenitrogenation activity, the heavy gas oil feedstock was contacted with the catalyst bed in a once-through operation at a weight hourly space velocity of 1.36 kg heavy gasoil per litre catalyst per hour (kg/l/h); a hydrogen gas/heavy gasoil ratio of 900 Nl/kg; and a total pressure of 112 bar (11.2 MPa). Hydrocracking performance was assessed in terms of the conversion of feedstock components having a boiling point of 370° C. or above to material boiling at less than 370° C., by analyzing product obtained at a catalyst bed temperature of 380° C. and after 620 hours on stream.

Hydrodesulfurization and hydrodenitrogenation performance was assessed on the same product, by measuring residual sulfur and nitrogen levels, respectively. From the results, shown in the following Table, it can be seen that catalysts "B" and "C" are significantly more active in hydrocracking, hydrodesulfurization and hydrodenitrogenation.

| | Catalyst | | |
|---|---|---|---|
| | A | B | C |
| Conversion of 370° C.+ (% w on feed, net) | 17.84 | 19.74 | 19.32 |
| Sulphur in liquid product (ppmw) | 322 | 241 | 298 |
| Nitrogen in liquid product (ppmw) | 25 | 14 | 16 |

Example 5

Preparation of a Catalyst not According to the Invention 16.55 g $MoO_3$, 3.27 g NiO, 25 g $H_2O$ and 6.02 g $H_3PO_4$ (85%) were combined and boiled for approximately 45 min. until a clear green solution was obtained. After cooling, total mass of the solution was determined to be 40.25 g. A 12.08 g portion of this solution was diluted to the required volume (13.2 ml) and used to impregnate 15.0 g of an amorphous silica-alumina carrier. The catalyst was subsequently dried at 70° C., in a vacuum stove. The loading of the catalyst, in mass % on a dry weight basis, was 3.5% Ni, 15.0% Mo and 2.2% P. (Denoted "D")

Example 6

Dibenzothiophene Hydrodesulfurization Performance Test (DBT Test)

Dibenzothiophene hydrodesulphurisation experiments were carried out in trickle flow, in a nanoflow reactor setup with six reactors. Each reactor was loaded with 385 mg of crushed and sieved catalyst particles (30-80 mesh), diluted with inert material to ensure proper hydrodynamic behaviour. Prior to testing, the catalysts were in situ presulfided with a mixture of hexadecane and 5.4 wt % of ditertiononylpentasulfide fed at 0.75 ml/min, in trickle flow with $H_2$ at a flow rate of 250 ml/g feed, heated at 20° C./h to 280° C. then maintaining it for 5 h, next heating at 20° C./h to 340° C. and maintaining it for 2 h. The test feed was a mixture of 5 wt % dibenzothiophene (DBT), 1.75 wt % dodecane and the remainder hexadecane, fed at 0.75 ml/min, in trickle flow with $H_2$ at a flow rate of 250 ml/g feed.

Results are summarized in the following Table.

| | DBT conversion (%) | | | | $k_{DBT}$ (g · min/ml) | | | |
|---|---|---|---|---|---|---|---|---|
| Catalyst | 230° C. | 245° C. | 260° C. | 270° C. | 230° C. | 245° C. | 260° C. | 270° C. |
| A | | | | 70.4 | | | | 1.55 |
| B | 29.3 | 65.4 | 96.3 | 99.7 | 0.49 | 1.49 | 4.63 | 8.37 |
| D | 14.7 | 34.7 | 55.8 | 73.6 | 0.22 | 0.60 | 1.14 | 1.87 |

The reaction constant for DBT conversion ($k_{DBT}$) was calculated assuming first order reaction kinetics in DBT conversion. From the results it is clear that catalyst B is significantly more active in DBT hydrodesulfurization than both comparative catalysts A and D.

That which is claimed is:
1. The process for preparing a sulphided hydrocracking catalyst comprising the steps of:
preparing an amorphous silica-alumina carrier, containing silica in an amount in the range of from 25 to 95% by weight based on the carrier, which is dried and calcined to provide a calcined catalyst carrier;
impregnating the calcined catalyst carrier with a solution, comprising one or more Group VIB metal components, one or more Group VIII metal components, and a $C_3$-$C_{12}$ polyhydric compound selected from the group consisting of sugars, sugar alcohols and sugar acids to provide an impregnated calcined catalyst carrier;

drying the impregnated calcined catalyst carrier at a temperature of at most 200° C. without calcination to form a dried but uncalcined impregnated carrier; and sulfiding the dried but uncalcined impregnated carrier to obtain a sulfided catalyst; wherein the amount of Group VIB metal in the sulfided catalyst is in the range of from 6 to 19 wt %, measured as metal, and the amount of Group VIII metal is in the range of from 1 to 6 wt %, measured as metal.

2. The process according to claim 1, wherein the $C_3$-$C_{12}$ polyhydric compound is present in the sulfided catalyst in an amount of 3-30 wt %.

3. The process according to claim 2, wherein the silica-alumina carrier further contains a zeolite.

4. The process according to claim 3, wherein the carrier comprises an amount of 1 to 10 wt % of zeolite, based on total weight of the carrier.

5. The process according to claim 4, wherein the $C_3$-$C_{12}$ polyhydric compound selected from the group consisting of sucrose, gluconic acid, and combinations thereof.

6. A process for hydrocracking a hydrocarbon stream comprising contacting the hydrocarbon stream in the presence of hydrogen with a catalyst prepared by a process according to claim 1.

7. The process according to claim 6, in which the catalyst is part of a stack of multiple catalyst beds, including a top bed including an alumina-based catalyst and a bottom bed including the catalyst.

8. The process according to claim 7, wherein the volume ratio of the catalyst to the alumina-based catalyst is in a range from 1:1 to 4:1.

* * * * *